(12) United States Patent
Ishikawa et al.

(10) Patent No.: US 6,310,158 B1
(45) Date of Patent: Oct. 30, 2001

(54) SULFUR-VULCANIZABLE BUTYL RUBBER AND RUBBER COMPOSITION CONTAINING THE SAME

(75) Inventors: Kazunori Ishikawa; Fumito Yatsuyanagi, both of Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/339,854

(22) Filed: Jun. 25, 1999

(30) Foreign Application Priority Data

Jul. 7, 1998 (JP) .................................................. 10-191462

(51) Int. Cl.⁷ ..................................................... C08F 28/06
(52) U.S. Cl. ........................... 526/257; 526/256; 526/258
(58) Field of Search ..................................... 526/256, 257, 526/258

(56) References Cited

U.S. PATENT DOCUMENTS 5,900,467 * 5/1999 Wideman et al. ..................... 525/349

FOREIGN PATENT DOCUMENTS 0 344 021    11/1989   (EP) .
57-15611      3/1982   (JP) .
9-111044      4/1997   (JP) .

* cited by examiner

*Primary Examiner*—Helen L. Pezzuto
(74) *Attorney, Agent, or Firm*—Arent Fox Kintner Plotkin & Kahn, PLLC

(57) ABSTRACT

A butyl rubber having at least one repeating unit of the formulae (I) and (II):

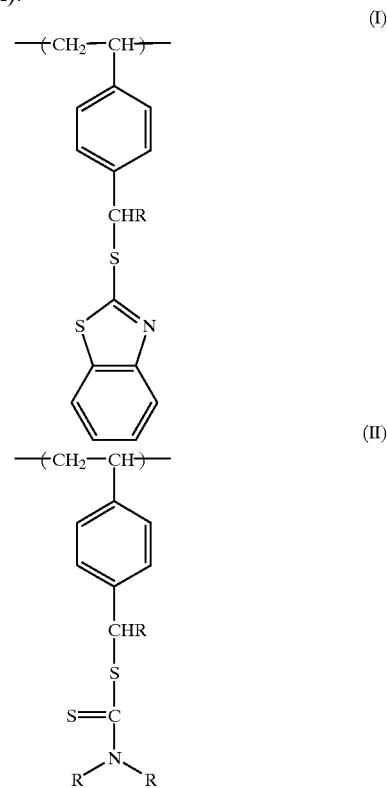

wherein R independently represents a hydrogen atom or at least one group selected from the group consisting of methyl, ethyl, propyl, isopropyl and butyl groups.

7 Claims, No Drawings

SULFUR-VULCANIZABLE BUTYL RUBBER AND RUBBER COMPOSITION CONTAINING THE SAME

BACKGROUND OF THE INVENTION

1. Field of Invention

The present invention relates to a sulfur vulcanizable novel butyl rubber and a rubber composition having an improved processability and vulcanized physical properties containing the same.

2. Description of the Related Art

Heretofore, butyl rubber is used as an inner liner, bladder of a tire, gasket, diagram, hose, belt, rubber vibration isolator, etc., utilizing the characteristics thereof (e.g., gas impermeability, vibration absorbance property). However, since butyl rubber accelerates the vulcanization, various attempts have been made to facilitate blending thereof with the other diene rubbers and various halogenated butyl rubbers having improved such properties. However, the butyl rubber has problem in that the weather resistance is not sufficient because the butyl rubber is of unsaturated type. Especially, the butyl rubber cannot be used as, for example, a sidewall of a tire, etc. Therefore, it has been proposed in U.S. patent application Ser. No. 88/199665 (or EP-A-344021) that butyl rubber is obtained by halogenating a copolymer containing p-alkyl styrene unit. This butyl rubber is surely excellent in the weather resistance etc., and therefore, the butyl rubber becomes usable as a tread, sidewall etc. of the tire. However, since the halogen group of the butyl rubber is highly reactive, the butyl rubber is reacted with other compounding agents such as silica and zinc oxide, and therefore, the new problem cause that, when silica is added, the viscosity is increased. Furthermore, when zinc oxide is initially compounded, there occurs a problem in that the zinc oxide is reacted with the butyl rubber. Thus, the timing at which zinc oxide is added should be limited. In addition, since this butyl rubber does not possess an unsaturated group, the vulcanization with sulfur is difficult and the covulcanization together with diene rubbers with sulfur are not possible in general, and therefore, the problems occur in the abrasion resistance, etc.

SUMMARY OF THE INVENTION

Accordingly, the object of the present invention is to provide a butyl rubber having an excellent weather resistance, which is capable of being vulcanized with sulfur without the increase in the viscosity when silica is compounded and without limitation of timing of adding zinc oxide.

In accordance with the present invention, there is provided a butyl rubber comprising at least one repeating unit selected from the group consisting of those having the formulae (I) and (II):

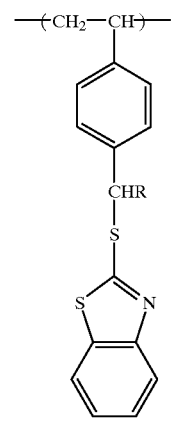

(I)

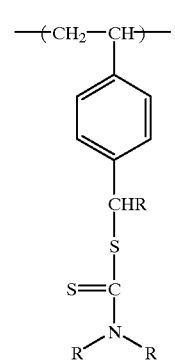

(II)

wherein R independently represents a hydrogen atom or at least one group selected from the group consisting of methyl, ethyl, propyl, isopropyl and butyl groups.

In accordance with the present invention, there is also provided a rubber composition comprising 100 parts by weight of a rubber component containing 3–100% by weight of the above-mentioned butyl rubber optionally blended with a diene rubber and 0.1 to 10 parts by weight of a sulfur vulcanizing agent.

In accordance with the present invention, there is further provided a rubber composition comprising 100 parts by weight of a rubber component containing 3–100% by weight of the above-mentioned butyl rubber and 10–100 parts by weight of silica.

In accordance with the present invention, there is further provided a rubber composition comprising 100 parts by weight of a rubber component containing 3–100% by weight of a halogenated butyl rubber obtained by halogenating a butyl rubber comprising isobutyrene and p-alkylstyrene and 0.3–10 parts by weight of at least one compound having the formulae (III) and (IV):

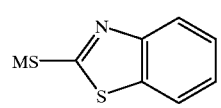

(III)

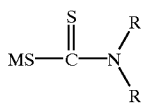

(VI)

wherein R independently represents a hydrogen atom or at least one group selected from the group consisting of methyl, ethyl, propyl, isopropyl and butyl groups, and M represents Na, K, Zn or Ti.

DESCRIPTION OF THE PREFERRED EMBODIMENTS

In order to accomplish the above-mentioned object of the present invention, the inventors of the present invention has extensively studied and has come to realize the reaction of the specified functional group to the halogen group of the halogenized alkylstyrene residue of the butyl rubber. Thus, the present invention was completed on the basis of those findings.

The present invention provides a butyl rubber having the repeating unit of the formulae (I) and/or (II). The butyl rubber according to the present invention preferably contains 70 mol % or more of the isobutyrene unit and may further contain, iso-monoolefin residue other than isobutyrene or the remaining unhalogenized p-alkylstyrene residue, so long as the desired properties of the vulcanized product are not impaired.

The content of the repeating unit (I) and/or (II) in the butyl rubber according to the present invention is preferably 0.1 to 10 mol %, more preferably 0.5 to 5 mol %, based upon the butyl rubber. If this content is too small, the vulcanization tends to be insufficient. Contrary to this, if too excessive the elongation, etc. of the vulcanized product tends to be decreased.

Although the butyl rubber according to the present invention can be obtained by copolymerizing the corresponding monomer with isobutyrene, it is preferable, in view of the polymerizability, stability and economical advantage, that the butyl rubber is produced by the method in which the corresponding halogenated butyl rubber is reacted with 2-mercapto benzothiazole or its amine or metal salt or dialkyl dithiocarbamic acid or its amine or metal salt. These reactions can be carried out by dissolving the above halogenated butyl rubber in a solvent such as toluene, hexane, cyclohexane, followed by reacting with the above-mentioned corresponding compound at a temperature of, for example, 60 to 120° C. for, for example, 5 to 30 minutes. Alternatively, this reaction can be carried out by mixing the above-mentioned compounds directly, or after dissolving in water, solvent, etc., by means of a pressurized kneader, Brabender type mixer, etc., for example, at 60 to 180° C. for 2 to 30 minutes.

Since the above-mentioned substituents have such structures that they easily generate radicals upon heating, the compounds are self-crosslinked by heating. Alternatively, the crosslinking is also carried out in the presence of a sulfur or a diene rubber upon heating by a sulfur vulcanization or a radical reaction. The amount of the sulfur is preferably 0.1 to 10 parts by weight, more preferably 0.5–5 parts by weight, based upon 100 parts by weight of the rubber, as in the case of the conventional halogenized butyl rubber.

The sulfur vulcanizing agents (or sulfur-containing vulcanizing agents) usable in the present invention include, for example, sulfur such as powder sulfur, precipitated sulfur, colloidal sulfur, insoluble sulfur, highly dispersible sulfur and sulfur-providing compounds such as polysulfide rubbers disclosed in, for example, "Rubber Industry Text Book (new edition) page 169 published by Japanese Rubber Association on Nov. 15, 1973". More specifically poly(ethylene tetrasulfide), poly(propylene tetrasulfide), poly (tetraethylene sulfide), etc. may be mentioned. In addition, sulfur-based vulcanizing agents recited in "Updated Technology of Additive for Polymer (in Japanese), pages 298–299, Jan. 6, 1988, published by CMC. More specifically, N,N'-dithio di(polymethylene imine), N,N'-bis (2-benzothiazoylthio)piperazine, etc. may be mentioned.

In addition, so-called SSO type, SSS type vulcanization accelerator (e.g., 2-4-di(O,O'-diisopropylphosphorotrithioyl)-6-morpholino-1,3,5-triazine, 2-(O,O'-diisopropylphosphorotrithioyl)-4,6-di(N, N-diethylamino-1,3,5-triazine) disclosed in JP-A-47-9488, JP-A-47-5391, JP-B-57-15611 may be preferably used as the sulfur-providing compound according to the present invention.

As the blend with diene rubbers, the blending amounts may be freely changed depending on the intended use. Examples of diene rubbers usable in the present invention are various polybutadiene rubbers (BR), various styrene-butadiene copolymer rubbers (SBR), various acrylonitrile-butadiene copolymer rubbers (NBR), various ethylene-propylene copolymer rubbers (EPC), various ethylene-propylene-diene terpolymer rubber (EPDM), various natural rubbers (NR), various polyisoprene rubbers (IR).

Known in the art as a rubber composition for a tire are compositions of butyl rubber obtained by halogenating p-alkylstyrene isobutylene copolymer and silica. When the butyl rubber according to the present invention is used in this composition, the physical properties of unvulcanized silica-containing butyl rubber composition can be improved. The amount of silica to be compounded can be varied based upon the intended use, but the preferable amount is 10–100 parts by weight based on 100 parts by weight of the rubber component.

In the case where silica is compounded, 2–20% by weight, based upon the weight of silica, of silane coupling agent is preferably used from the viewpoints of the reinforcement. In addition, when the alkoxysilyl group-containing polysiloxane such as methyl ethoxy polysiloxane, methyl methoxy polysiloxane, phenyl ethoxy polysiloxane, disclosed in JP-A-9-111044 is compounded, the dispersibility is preferably improved. There are no limitations to the silica to be compounded, but dry-method white carbon, wet-method white carbon, colloidal silica, precipitated silica may be exemplified. Among these, the wet-method white carbon having a nitrogen adsorption specific surface of 100–220 m$^2$/g may be especially preferably used.

The butyl rubber according to the present invention may be used after synthesized as mentioned above when compounding with the other compounding agents. Alternatively, the compound having the above formulae (III) and/or (IV) may be compounded when compounding with the other compounding agents. In this case, the use of the sodium salts having a high reactivity is especially preferable.

The rubber composition according to the present invention may contain, in addition to the above-mentioned essential components, carbon black, vulcanization accelerator, various types of vulcanization activators, antioxidants, plasticizers, fillers, and other various additives generally compounded for rubber compositions. As long as the amounts of these additives do not contravene the object of the present invention, it is possible to use the conventional general amounts of formulation.

EXAMPLES

The present invention will be explained below in further detail using Synthesis Examples, Examples, Standard Examples, and Comparative Examples, but the scope of the present invention is, of course, not limited to these Examples.

Synthesis Example 1 (Synthesis of Modified Butyl Rubber 1

To 100 g of EXXPRO 90-10 (available from EXXON Co.), 4 g of sodium salt of 2-mercaptobenzothiazole dissolved in 4 g of water was added, followed by mixing at 150° C. for 20 minutes by means of a pressure kneader.

In the resultant modified butyl rubber, the methylene group corresponding to the formula (V):

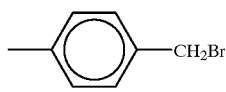

(V)

completely disappeared and the methylene group corresponding to the formula (VI):

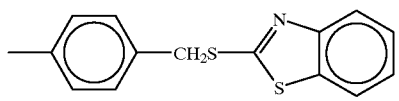

(VI)

appeared, when confirmed by $^1$H NMR.

Synthesis Example 2 (Synthesis of Modified Butyl Rubber 2)

To 100 g of EXXPRO 90-10 (available from EXXON Co.) 4 g of sodium salt of N,N-diethyldithiocarbamic acid dissolved in 4 g of water was added followed by mixing at 80° C. for 60 minutes by means of a pressure kneader.

In the resultant modified butyl rubber, the methylene group corresponding to the above-mentioned formula (V) completely disappeared and the methylene group corresponding to the formula (VII):

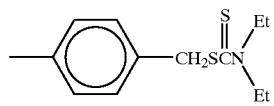

(VII)

appeared when confirmed by $^1$H NMR.

Synthesis Example 3 (Synthesis of Modified Butyl Rubber 3)

To 100 g of EXXPRO 90-10 (available from EXXON CO.), 2.5g of sodium salt of butylmercaptan dissolved in 4 g of water was added, followed by mixing at 150° C. for 20 minutes by means of a pressure kneader.

In the resultant modified butyl rubber, the methylene group corresponding to the above-mentioned formula (V)

completely disappeared and the methylene group corresponding to the formula (VIII).

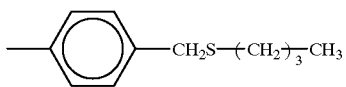

(VIII)

appeared when confirmed by $^1$H NMR.

Standard Example 1. Examples 1–4 and Comparative Examples 1–3

Preparation of Sample

The ingredients other than the vulcanization accelerator and sulfur in the formulations shown in Table I were mixed in a 1.8 liter closed type mixer for 3 to 5 minutes. When the temperature of the mixture reaches 165±5° C., the mixtures were discharged. The vulcanization accelerator and sulfur were then mixed by an 8-inch open roll with the masterbatch obtained above to obtain a rubber composition. The unvulcanized physical properties of the rubber compositions thus obtained were measured.

Then, the composition was vulcanized by pressing the composition in 15×15×0.2 cm mold at 160° C. for 20 minutes to prepare the desired test piece (i.e., rubber sheet) which was then evaluated for vulcanized physical properties.

The ingredients used in each Example are as follows
SBR: Nipol NS116 (Nihon Zeon)
Carbon black: Seast KH (Tokai Carbon)
Silica: Nipsil AQ (Nihon Silica Kogyo)
Silane coupling agent: Si69 (Degussa)
Zinc oxide: Zinc oxide #3
Sulfur: 5% oil treated powder sulfur
Accelerator: Cyclohexyl benzothiazyl sulphen amide The test methods of the unvulcanized physical properties and the vulcanized physical properties of the compositions obtained in the Examples were as follows. The results are shown in Table 1

Unvulcanized Physical Properties

1) Mooney Viscosity

Determined by a method according to JIS (Japan Industrial Standard) K 6300 at 100° C.

2) Scorch Time

Determined by a method according to JIS K 6300 at 125° C., where the time (min) was measured when the viscosity is increased by 5 points.

3) Vulcanization Time

Determined by a method according to JIS K 6300 at 160° C., where the time (min) was measured when 95% degree of vulcanization was attained.

Vulcanized Physical Properties

JIS Hardening Hs: Determined by a method according to JIS K 6253 at 20° C.

Elongation at break Eb: Determined by a method according to JIS K 6251 (Dumbbel #3)

Tb: Determined by a method according to JIS K 6251 (Dumbbel #3)

TABLE I

|  | Standard Example 1 | Example 1 | Example 2 | Comparative Example 1 |
|---|---|---|---|---|
| Ingredient (wt. part) |  |  |  |  |
| EXXPRO 90-10 | 100 | — | — | — |
| Modified butyl rubber 1 | — | 100 | — | — |
| Modified butyl rubber 2 | — | — | 100 | — |
| Modified butyl rubber 3 | — | — | — | 100 |
| SBR | — | — | — | — |
| Carbon black | — | — | — | — |
| Silica | — | — | — | — |
| Silane coupling agent | — | — | — | — |
| Sulfur | 1.7 | 1.7 | 1.7 | 1.7 |
| Zinc oxide | 1 | 1 | 1 | 1 |
| Stearic acid | 1 | 1 | 1 | 1 |
| Accelerator CZ | 1 | 1 | 1 | 1 |
| Vulcanized Property |  |  |  |  |
| Eb (%) | 90 | 410 | 380 | *1 |
| Tb (MPa) | 0.8 | 6.3 | 5.2 | *1 |
| HS (20° C.) |  |  |  |  |
| Surface condition | No tack | No tack | No tack | Tack formed |

|  | Example 3 | Comparative Example 2 | Example 4 | Comparative Example 3 |
|---|---|---|---|---|
| Ingredient (wt. parts) |  |  |  |  |
| EXXPRO 90-10 | — | 20 | — | 20 |
| Modified butyl rubber 1 | 20 | — | 20 | — |
| Modified butyl rubber 2 | — | — | — | — |
| Modified butyl rubber 3 | — | — | — | — |
| SBR | 80 | 80 | 80 | 80 |
| Carbon black | 60 | 60 | 80 | 80 |
| Silica | 20 | 20 | — | — |
| Silane coupling agent | 2 | 2 | — | — |
| Sulfur | 1.7 | 1.7 | 1.7 | 1.7 |
| Zinc oxide | 1 | 1 | 1 | 1 |
| Stearic acid | 1 | 1 | 1 | 1 |
| Accelerator CZ | 1 | 1 | 1 | 1 |
| Property before vulcanization |  |  |  |  |
| Scorch time (min) | 28.3 | 25.6 | 24.8 | 24.3 |
| Vulcanization time (min) | 14.8 | 14.5 | 11 | 13.5 |
| Mooney viscosity $ML_{1+4}$ (100° C.) | 65.6 | 91 | 68 | 81.8 |
| Property after vulcanization |  |  |  |  |
| Eb (%) | 444 | 413 | 390 | 348 |
| Tb (MPa) | 17.5 | 17.3 | 19.4 | 19 |
| Hs (20° C.) | 68.2 | 68.2 | 69 | 69 |
| Surface condition | No tack | No tack | No tack | No tack |

*1 No vulcanization product obtained

As is clear from Table I, when the results of Standard Example 1 and Examples 1 and 2, the physical properties are largely different even though the same vulcanizing agent was used. This is derived from the difference in the vulcanization mode. The former is believed to be the vulcanization with zinc oxide, whereas the latter is believed to be the vulcanization with sulfur. In the case of Comparative Example 1, the vulcanization is not carried out when the substituent difficult to generate the radical is reacted. In the case of Example 3, whose SBR is blended with the butyl rubber and silica is also blended, the viscosity is largely decreased when compared with Comparative Example 2. In the case of the carbon black, the unvulcanized rubber properties is improved. This is also true for the elongation and the strength.

Further, when Example 4 and Comparative Example 3 are compared, ever when only carbon black is compounded, the viscosity is largely decreased and the vulcanization time is also largely shortened.

Thus, according to the present invention, the butyl rubber in combination with the other diene rubber capable of co-vulcanizing with sulfur, without impairing the compounding properties ever when the alkali and zinc oxide are used.

What is claimed is:

1. A butyl rubber comprising at least one repeating unit selected from the group consisting of those having the formulae (I) and (II):

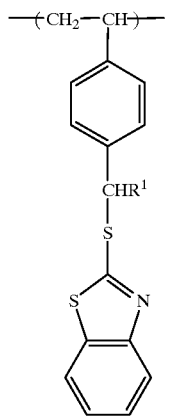

(I)

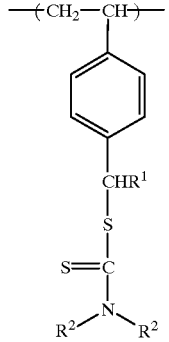

(II)

Wherein $R^1$ independently represents a hydrogen atom or at least one alkyl group selected from the group consisting of methyl, ethyl, propyl, isopropyl and butyl groups and $R^2$ independently represents a hydrogen atom or at least one alkyl group selected from the group consisting of methyl, ethyl, propyl, isopropyl and butyl groups.

2. A rubber composition comprising 100 parts by weight of a rubber component containing 3–100% by weight of the butyl rubber according to claim 1 and 0.1 to 10 parts by weight of a sulfur vulcanizing agent.

3. A rubber composition comprising 100 parts by weight of a rubber component containing 3–100% by weight of the butyl rubber according to claim 1 and 10–100 parts by weight of silica.

4. A rubber composition as claimed in claim 2, wherein the rubber component is blended with a diene rubber.

5. A rubber composition as claimed in claim 2, wherein the content of the repeating unit in the butyl rubber is 0.1 to 10 mol %, based upon the butyl rubber.

6. A rubber composition as claimed in claim 2, wherein the sulfur vulcanizing agent is selected from the group consisting of sulfur, sulfur-providing compounds, and sulfur-based vulcanizing agents.

7. A rubber composition as claimed in claim 6, wherein the amount of the sulfur, based upon 100 parts by weight of the rubber.

* * * * *